United States Patent [19]

Moore

[11] Patent Number: 4,487,212
[45] Date of Patent: Dec. 11, 1984

[54] VEHICLE PORTS OR VEHICLE COVERING SYSTEMS AND APPARATUS

[76] Inventor: Richard P. Moore, P.O. Box 471, Germiston, 1400, Transvaal, South Africa

[21] Appl. No.: 282,773

[22] Filed: Jul. 13, 1981

Related U.S. Application Data

[63] Continuation of Ser. No. 37,801, May 10, 1979, abandoned.

[30] Foreign Application Priority Data

May 6, 1978 [ZA] South Africa ................ 78/3193
May 12, 1978 [ZA] South Africa ................ 78/2745

[51] Int. Cl.³ .................................................. E04F 10/00
[52] U.S. Cl. ..................................... 135/90; 135/88; 135/117
[58] Field of Search ............ 135/5 A, 8, 14 R, 14 V, 135/5.3, 6, 7, 90, DIG. 5, DIG. 8, 87, 88, 903, 905, 107; 296/136

[56] References Cited

U.S. PATENT DOCUMENTS

| | | | |
|---|---|---|---|
| 739,389 | 9/1903 | Castle | 135/6 |
| 844,220 | 2/1907 | Westbrook | 135/8 |
| 1,114,057 | 10/1914 | Spaulding | 135/8 |
| 1,285,766 | 11/1918 | Martin | 135/5 A |
| 1,759,628 | 5/1930 | Pellegrino | 135/8 |
| 2,639,751 | 5/1953 | Flaherty | 135/6 |
| 2,688,973 | 9/1954 | Reiman | 135/8 |
| 3,316,012 | 4/1967 | Thier | 135/5 A |
| 3,875,952 | 4/1975 | Black | 135/8 |

FOREIGN PATENT DOCUMENTS

| | | | |
|---|---|---|---|
| 2428074 | 12/1975 | Fed. Rep. of Germany | 135/8 |
| 474275 | 11/1913 | France | 135/8 |

Primary Examiner—Richard C. Pinkham
Assistant Examiner—T. Brown
Attorney, Agent, or Firm—William A. Drucker

[57] ABSTRACT

The invention provides a vehicle covering system which includes a frame from which a flexible cover is supported by a number of cords from the frame. The cords run over a multiple pulley system and are wound on a winch, the operation of which serves to lower the cover over a vehicle located beneath it or raise the cover off the vehicle.

26 Claims, 1 Drawing Figure

U.S. Patent
Dec. 11, 1984
4,487,212
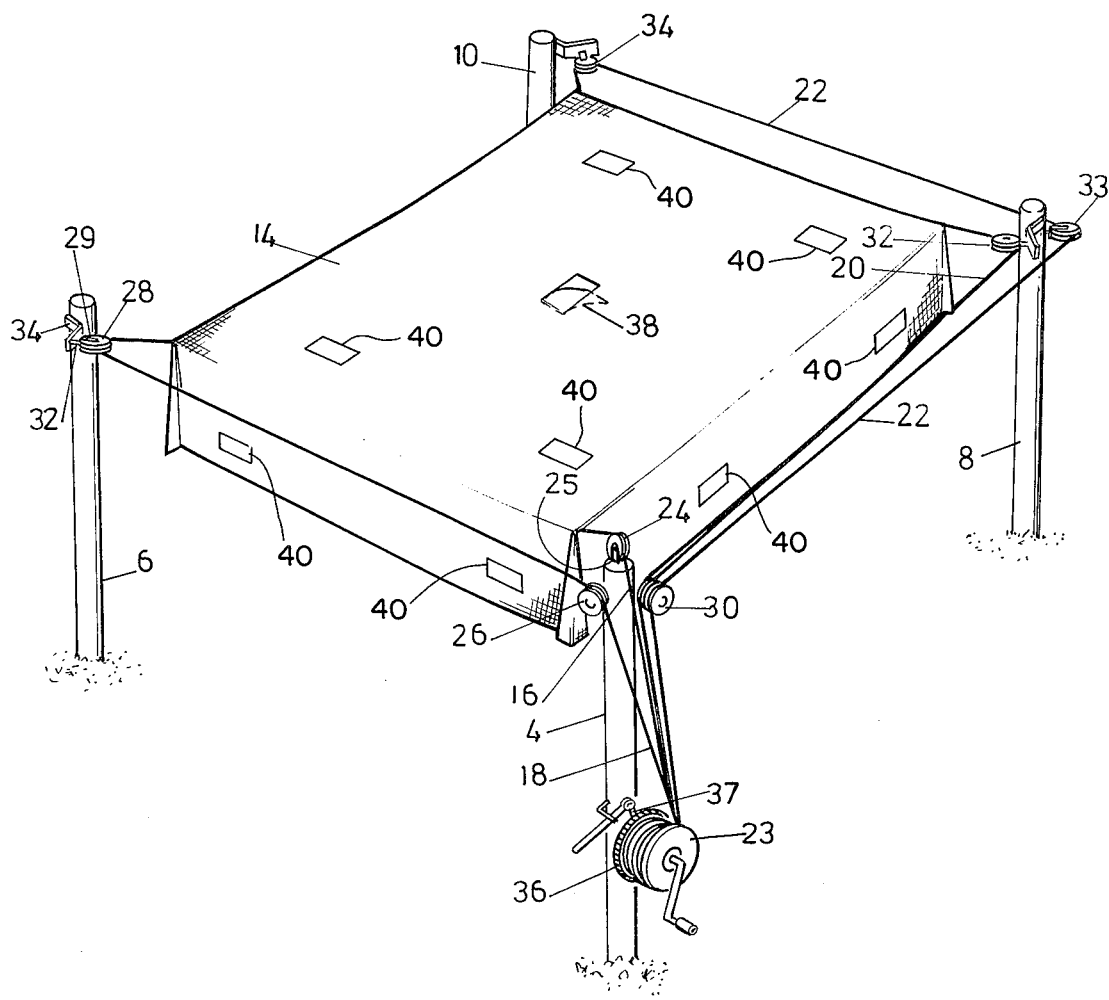

VEHICLE PORTS OR VEHICLE COVERING SYSTEMS AND APPARATUS

This is a continuation of Ser. No. 37,801 filed May 10, 1979 and since abandoned.

The present invention relates to improvements in vehicle ports or vehicle covering systems and apparatus.

A conventional car port has the disadvantage of normally providing only a roof, the car otherwise being completely open to the weather, dust or sun at an angle. Even with a conventional garage there is often condensation and dust formation on the vehicle and of course, a garage is relatively costly.

It is an object of the present invention to provide a novel vehicle covering system.

A vehicle covering system according to the invention includes a flexible cover, means to support the flexible cover above a vehicle in a hoisted and therefore tensioned state, means to lower the cover over the vehicle and relieve the tension, and means to raise the cover off the vehicle and tension it as it moves to its hoisted position.

In one form of the invention the means to support the cover includes a frame comprised of four posts spaced suitably outside the plan rectangular dimensions of the vehicle to be covered. The posts may be fixed to the surface, where the car is to be located, suitably by being driven into or concreted into the surface. In another alternative the posts, which may be joined by transverse members, can be stayed with cords or wire to suitable support points. The frame may include strengthening cross members extending between the posts.

In another form of the invention the means to support the cover may be constituted by the walls of a garage.

The cover may be made of any suitable flexible material such as canvas.

In one form of the invention the one end of the flexible cover may, in the supported position, be at a lower level than the other end of the cover. Such an arrangement facilitates drainage of rain water deposited on the upper surface of the cover.

In another form of the invention one end of the cover is secured at or adjacent the surface on which the vehicle is to be located and the other end of the cover is lowered and raised to lower and raise the cover relative to the vehicle.

In yet another form of the invention the cover may in its hoisted position be substantially horizontal.

The cover may in one form be raised and lowered by means of one or more cords attached to the cover. Preferably, however, the means to raise and lower the cover includes cords and a multiple pulley system and means to motivate the cords.

The cover is suitably substantially rectangular, the cords are four in number and are attached to the four corners of the cover or are attached to the cover a suitable distance from the edges of the cover to allow the edges of the cover to drape in the hoisted position. The latter arrangement has the advantage of reducing the plan area of the cover for stowage and also reducing the cord hoisting distance.

The means to motivate the cords suitably includes a winch which may motivate the four cords simultaneously and which may be manually or power driven. The motivating means may include a locking system to hold the cover in the hoisted position. The locking system may be automatic and preferably includes a ratchet and pawl, manually releasable to allow the cover to be lowered.

To anchor the cover against wind, the cover may be weighted or suitable anchoring means may be furnished. The anchoring means may consist of magnetic elements which are adapted to anchor against the body of the vehicle or may consist of hooked resilient tie members adapted to engage pairs of eyelets in the cover or to engage an eyelet in the cover and the bumper of the vehicle.

The cover preferably includes at least one orifice located at the lowest point of the cover in the hoisted position for discharging rainwater. The orifice is preferably equipped with a flap which allows drainage from the cover in the hoisted position and which is closed on coming to rest against the body of the vehicle.

A preferred embodiment of the vehicle covering system of the invention is illustrated by way of example in the accompanying drawing which is a perspective view of a vehicle covering system according to the invention.

Referring to the drawing, the frame is comprised of four vertical posts 4, 6, 8 and 10 driven into or concreted into the ground or otherwise fixed to the surface, where the vehicle is to be located and spaced outside the plan rectangular dimensions of the vehicle.

A flexible cover 14 of canvas or other suitable material is supported off the frame by means of four flexible cords 16, 18, 20 and 22 which run over a pulley system to a winch 23 which constitute a single source means for lifting and lowering the cover; the winch is mounted on the post 4. The cords 16, 18, 20 and 22 are attached to the cover a distance from each corner thereof. The pulley system will now be described in greater detail.

The cord 16 passes over a pulley 24 which is rotatably mounted in a clevis 25 secured to the top of the post 4 and is then connected directly to the cover 14.

The cord 18 passes over a pulley 26 mounted onto the side of the post 4 and then around a further pulley 28 and hence to the cover 14. The pulley 28 is rotatably mounted in a clevis 29 which in turn is rotatably journaled on a pin 32 which is free to rotate in a bracket 34 fixed to the post 6. Adjacent the pulley 28 the pin 32 has a head (not shown) which serves to retain the clevis 29 on the pin 32.

The cords 20 and 22 on leaving the winch 23 passes over a double pulley secured to the side of the post 4 towards the post 8 where the cord 20 runs over a pulley 32 arranged and pivotally mounted in a manner similar to the pulley 28 and then to the cover 14.

The cord 22 passes around a horizontally mounted pulley, which is mounted on the post 8 in a manner similar to the pulley 24 and then around a pulley 34 and then connected to the cover 14. The mounting of the pulley 34 is similar to that of the pulleys 28 and 32.

The shaft of the winch 23 has fixed to it a ratchet wheel 36. A pawl 37 is pivotally mounted on the post 4 so as to be normally gravity biased into engagement with the ratchet wheel 36. The pawl and ratchet is designed to allow winding of the winch 23 but not unwinding. As the cords 16, 18, 20 and 22 are wound up onto the winch 23, the flexible cover 14 will be raised to the hoisted position shown in the drawing. The pawl 37 and ratchet 36 normally secures the winch against unwinding, thus holding the cover 14 in the hoisted position. This is the position in which the cover 14 is normally stowed.

In use, the vehicle to be covered is driven beneath the cover 14 and the cover 14 is then lowered onto the vehicle completely draping it by manually disengaging the pawl 37 from the ratchet wheel 36 and allowing the winch to freely unwind under the weight of the cover. With the cover draping the vehicle the latter is protected from the sun's rays, dust, rain or the like. To anchor the cover against wind, magnetic elements 40 are adapted to anchor against the body of the vehicle. The vehicle is uncovered by simply winching the cover 14 to its original hoisted position.

A flap 38 covering an orifice in the cover 14 provides a suitable drain to release rainwater accumulated on the cover 14 while in the hoisted position.

This invention is not limited to the precise constructional details described and many variations in detail are possible without departing from the spirit and scope of the invention. For example, the four post frame shown in the drawings could be replaced by two robust posts with overhead arms.

I claim:

1. A vehicle covering system comprising a waterproof flexible, rodless, rigid memberless cover that drapes a vehicle snugly by gravity in its lowered or covering position, single source means operable from one position to lift the cover from a vehicle, raise it above the vehicle, tension it and store it in a raised tensioned state and said single source means functioning to lower the cover over a vehicle and relieve the tension, the whole arrangement being such that a vehicle may be driven into the position in which it may be covered and driven away when it has been uncovered eliminating the necessity for any rods or rigid members integral with or directly shaping the cover.

2. A vehicle covering system as claimed in claim 1 on which the means to support and tension the cover include at least four fixed support points spaced outside the plan rectangular dimensions of the vehicle to be covered at a suitable height.

3. A vehicle covering system as claimed in claim 2 in which the support points are located on vertical posts.

4. A vehicle covering system as claimed in claim 3 in which the cover is substantially rectangular, the cords are four in number and are attached to the four corners.

5. A vehicle covering system as claimed in claim 3 in which the raising, lowering and tensioning means for the cover includes cords attached directly to the cover.

6. A vehicle covering system as claimed in claim 5 in which the means to raise, lower and tension and hold the cover includes cords and a multiple pulley system and means to motivate the cords.

7. A vehicle covering system as claimed in claim 6 in which the cover is substantially rectangular, the cords are four in number and are attached to the cover a suitable distance from the edges of the cover so that the main body of the cover is tensioned but the edges of the cover drape in the hoisted position.

8. A vehicle covering system as claimed in claim 7 in which the means to motivate the cord includes a winch.

9. A vehicle covering system as claimed in claim 8 in which the winch motivates the four cords simultaneously.

10. A vehicle covering system as claimed in claim 9 in which the motivating means includes a locking system to hold the cover in the hoisted position.

11. A vehicle covering system as claimed in claim 10 in which the locking system is automatic.

12. A vehicle covering system as claimed in claim 11 in which the locking system includes a ratchet and pawl, manually releasable to allow the cover to be lowered.

13. A vehicle covering system as claimed in claim 10 in which the pulleys swivel about a fulcrum mounting so that they automatically align with the changing positions of the cords to cover fixed points as the cover is raised and lowered.

14. A vehicle covering system as claimed in claim 13 in which the cover is made of canvas.

15. A vehicle covering system as claimed in claim 10 in which the cover in its hoisted, tensioned and storing position is substantially horizontal.

16. A vehicle covering system comprising:
    (a) a pulley retaining means positioned at the four corners of a first quadrilateral,
    (b) a rodless, rigid memberless, flexible, waterproof cover disposed entirely within the four corners of said quadrilateral,
    (c) cover tensioning pulley means secured to each said pulley retaining means,
    (d) cover support means secured to the upper surface of said cover at four points, forming a second quadrilateral of similar shape within the first said quadrilateral and permitting the borders of the cover to drape, and
    (e) tensioning means secured to said support means, said support means being operatively associated with said pulley means, said tensioning means and said support means providing an upward force component to said cover at said four points followed by a substantially horizontal tensioning force thereon, the arrangement being such that the necessity for any rods or rigid members directly shaping the cover is eliminated and all four tensioning means are simultaneously motivated from a single operative point.

17. A vehicle covering as set forth in claim 16 wherein said pulley retaining means comprises four posts, said pulley means comprises pulleys on each of said posts, said support means comprises rope secured to said tensioning means and passing over each of said pulleys.

18. A vehicle cover as set forth in claim 17 further including an aperture in the center of said cover and a flap secured to said cover for covering said aperture responsive to an upward force thereon.

19. A vehicle cover as set forth in claim 18 further including means secured to said cover for securing said cover to a said vehicle.

20. A vehicle cover as set forth in claim 16 wherein said tensioning means comprises a ratchet and a pawl.

21. A vehicle cover as set forth in claim 20 further including an aperture in the center of said cover and a flap secured to said cover for covering said aperture responsive to an upward force thereon.

22. A vehicle cover as set forth in claim 21 further including means secured to said cover for securing said cover to a said vehicle.

23. A vehicle cover as set forth in claim 20 further including means secured to said cover for securing said cover to a said vehicle.

24. A vehicle cover as set forth in claim 16 further including an aperture in the center of said cover and a flap secured to said cover for covering said aperture responsive to an upward force thereon.

25. A vehicle cover as set forth in claim 24 further including means secured to said cover for securing said cover to a said vehicle.

26. A vehicle cover as set forth in claim 16 further including means secured to said cover for securing said cover to a said vehicle.

* * * * *